(12) United States Patent
Müller et al.

(10) Patent No.: US 6,231,276 B1
(45) Date of Patent: May 15, 2001

(54) CUTTING TOOL WITH AN INSERTABLE ADJUSTABLE STOP, AND AN ADJUSTABLE STOP FOR A CUTTING TOOL

(75) Inventors: Gebhard Müller, Fürth; Horst Jäger, Nürnberg; Martin Voll, Eggolsheim, all of (DE)

(73) Assignee: Kennametal Hertel AG Werkzeuge + Hartstoffe, Furth (DE)

( * ) Notice: Subject to any disclaimer, the term of this patent is extended or adjusted under 35 U.S.C. 154(b) by 0 days.

(21) Appl. No.: 09/303,283

(22) Filed: Apr. 30, 1999

Related U.S. Application Data

(63) Continuation-in-part of application No. PCT/EP98/00470, filed on Jan. 29, 1998.

(30) Foreign Application Priority Data

Mar. 27, 1997 (DE) ................................. 197 12 959
Apr. 26, 1997 (DE) ................................. 197 17 741

(51) Int. Cl.⁷ ................................. B23B 27/16; B26D 1/00
(52) U.S. Cl. ................................. 407/87; 407/92; 407/95; 407/103
(58) Field of Search ................................. 407/36, 37, 38, 407/44, 45, 85, 86, 87, 92, 95, 103

(56) References Cited

U.S. PATENT DOCUMENTS

| 1,354,636 | * | 10/1920 | Whitfield | 407/92 X |
| 3,655,969 | * | 4/1972 | Pollington et al. | 407/87 |
| 4,040,156 | * | 8/1977 | Tack | 407/44 |
| 4,428,704 | * | 1/1984 | Kalokhe | 407/37 X |
| 6,033,157 | * | 3/2000 | Satran et al. | 407/37 |

FOREIGN PATENT DOCUMENTS

| 3936243 | 5/1991 | (DE) . |
| 9204587 | 9/1992 | (DE) . |
| 0713739 | 5/1996 | (EP) . |

* cited by examiner

*Primary Examiner*—Henry Tsai
(74) *Attorney, Agent, or Firm*—Nils H. Ljungman & Associates

(57) ABSTRACT

In addition to having a stop member in the form of a hollow cylinder which is slotted and can be spread by means of an adjustment screw, an adjustable stop for a cutter adjustably arranged in a main casting or body of a tool is also provided with a sleeve member which can be inserted into a longitudinal bore of the stop member. The sleeve member has inside threads which can be brought into engagement with the adjustment screw. This results in an improvement of the load carrying capacity of the threaded connection. Since the sleeve member can move in the adjustment direction, the bending load on the adjustment screw is reduced.

18 Claims, 4 Drawing Sheets

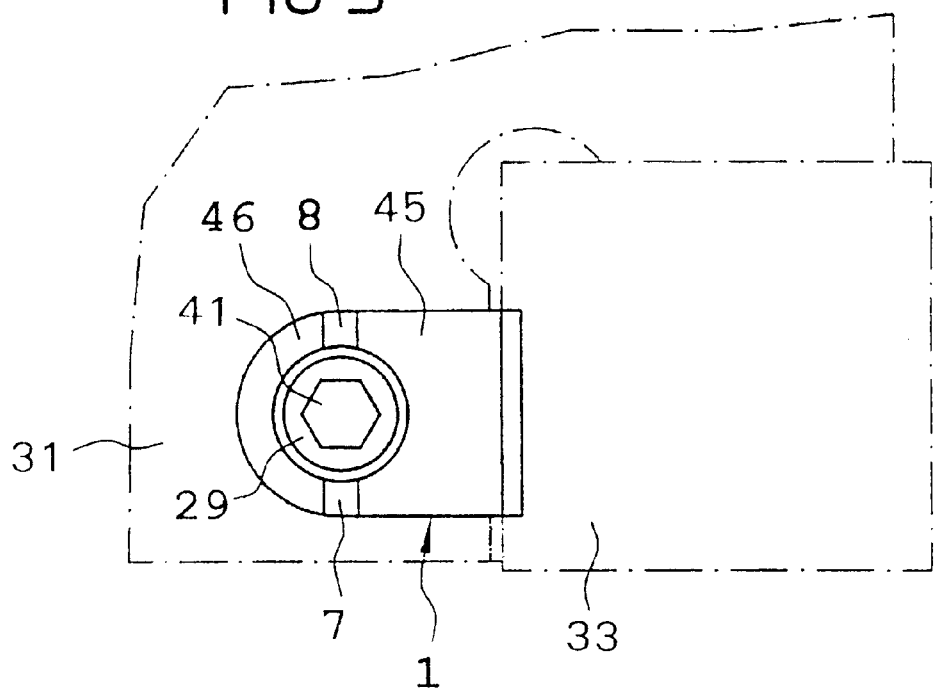
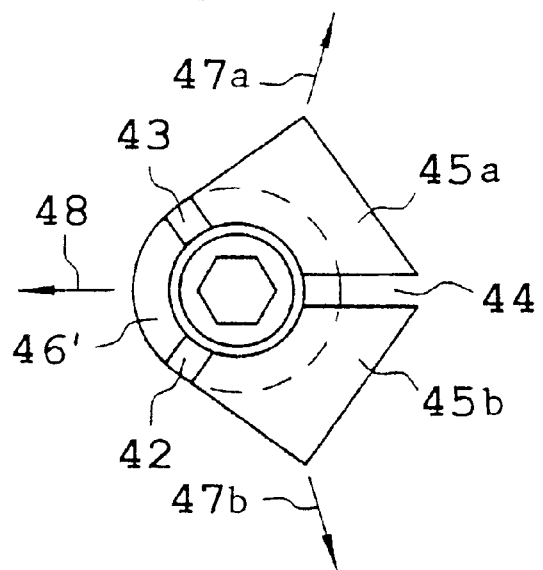

CUTTING TOOL WITH AN INSERTABLE ADJUSTABLE STOP, AND AN ADJUSTABLE STOP FOR A CUTTING TOOL

CONTINUING APPLICATION DATA

This application is a Continuation-In-Part application of International Application No. PCT/EP98/00470, filed on Jan. 29, 1998, which claims priority from Federal Republic of Germany Patent Application No. 197 12 959.5, filed on Mar. 27, 1997, and Federal Republic of Germany Patent Application No. 197 17 741.7, filed on Apr. 26, 1997. International Application No. PCT/EP98/00470 was pending as of the filing date of the above-cited application. The United States was an elected state in International Application No. PCT/EP98/00470.

BACKGROUND OF THE INVENTION

1. Field of the Invention

The invention relates to an adjustable stop for an insert arranged in the main casting or body of a tool having a stop member in the form of a hollow cylinder which is slotted and can be spread by means of an adjustment screw.

2. Background Information

Such an adjustable stop is known, for instance from the published German Patent Application No. 42 43 586 A1. The stop serves in the adjustment of a cutter in the form of a knife guided in a guide slot of a main casting or body of a tool. The adjustable stop comprises a stop member in the form of a hollow cylinder over its entire length, the slotted head of which can be expanded in a radial direction by means of an adjusting screw in order to displace the cutter. For this purpose, the stop member is inserted into a stepped bore provided in the main casting or body, whereby the remaining area of the stepped bore extending to the face of the main casting or body and having a closed circumference defines the adjustment lift.

Due to the different radii of curvature of the stop on the one hand and of the remaining area of the stepped bore on the other, contact is achieved only at points both at the side of the stop facing the cutter as well as on its opposite bearing side facing the main casting. This has the disadvantage that even at low clamping or cutting forces, the stop is overloaded as a result of a high local stress concentration. That in turn can lead to a loss of positioning accuracy and/or stability. Since in addition, the inside threads guiding the adjusting screw follow along the slotted area of an adjustment movement required for a particular adjustment, and consequently positive thread engagement no longer exists in this area, the stability under load of such a threaded connection is only limited, especially at maximum adjustment.

OBJECT OF THE INVENTION

The object of the invention is therefore to provide an adjustable stop for an insert adjustably arranged in the main casing of a tool in which the load capacity of the connection between an adjustment screw and threads guiding said screw is particularly high.

SUMMARY OF THE INVENTION

This objective can be attained in accordance with the present invention by an adjustable stop for a cutter adjustably arranged in a main casting of a tool and having a stop member in the form of a hollow cylinder, which stop member is slotted and can be spread by means of an adjustment screw. A sleeve member can be provided that can be inserted into a longitudinal bore of the stop member, said sleeve member having inside threads that can be brought into engagement with the adjusting screw.

In a preferred embodiment, the end of the longitudinal bore of the stop member at the stop end can be provided with a substantially conical internal surface (inner cone) adjoined by a seat area for the sleeve member. This conical form of the head area of the stop member can make a particularly precise adjustment of the insert possible. The arrangement of several transverse slots, which preferably can subdivide the cross-sectional area of the stop member into substantially equal segments, can make it possible to control the effective direction of expansion. Thus, for instance, it is possible to bring about two effective directions at an acute angle to one another by means of three transverse slots on the stop side of the stop member facing the cutter. Each transverse slot preferably can have an expansion bore in its inner end region.

In one possible embodiment of the present invention, multiple transverse slots can subdivide the the cross-sectional area of the stop member into equal or substantially equal segments. The direction of expansion of the segments can be controlled. Thus, for example, three transverse slots can be positioned in the stop side of the stop member. The segments can therefore be expanded at acute angles to one another. Each transverse slot can have a corresponding expansion bore.

The sleeve member can be expediently inserted into the longitudinal bore of the stop member from the face opposite the insertion end for the adjustment screw. At its open end, the sleeve member is advantageously formed in the shape of a collar, in which at least one collar part of a corresponding retaining collar can be engaged with a supporting shoulder in the form of a recess provided in the elongation of the transverse slot of the stop member. In a simple manner, this fixes the sleeve member in an axial direction and prevents it from turning in relation to the stop member as well.

In another possible embodiment of the present invention, the sleeve member can be inserted into the longitudinal bore of the stop member from the end opposite the insertion end for the adjustment screw. At its open end, the sleeve member can be advantageously formed with a retaining collar structure extending about and around the end. At least part of the retaining collar structure can be engaged with a supporting shoulder in the form of a recess provided adjacent the transverse bore of the stop member. In a simple manner, the engagement of the retaining collar with the recess and supporting shoulder can fix the sleeve member in the axial direction and can prevent the sleeve member from turning in relation to the stop member.

Beneath the head end of the stop member, an open area is provided between the stop member and the sleeve member so that the inside threads can follow an adjustment movement particularly well. At the same time, a corresponding relief to produce the open area is provided on the internal sleeve end so that the outside diameter of the sleeve member at that point is smaller than the internal diameter of the stop member by the amount of the open area.

In one possible embodiment of the present invention, beneath the head end of the stop member, an open area can be provided between the stop member and the sleeve member so that the inside threads of the sleeve member can follow an adjustment movement particularly well. The sleeve member can have on its end a corresponding relief or recessed portion or cut-away portion to produce the open area. The outside diameter of the portion of the sleeve member adjacent the relief is smaller than the internal diameter of the stop member, thereby producing the open area.

In an expedient further development of the stop member, a relief or recessed portion or cut-away portion limiting the adjustment lift or defining it can be provided in the outer surface of the stop member in a manner analogous to the relief of the sleeve member. This relief in turn can determine the amount of freedom for a maximum adjustment. Furthermore, the bearing area of the stop member facing the main casting or body can be expediently rounded off, whereby this bearing area at least approximates the round form. In addition to being easily manufactured, this rounded off or half round bearing area can make particularly precise positioning and radial alignment of the contact surface between the stop member and the main casting of the tool possible during adjustment or setting.

In contrast, the stop side facing the insert can have a linear form, making it possible to obtain a broad area of contact between the insert and the stop head of the stop member. In this connection, the stop side is advantageously executed in the form of a collar in which the stop surface to be brought into contact with the insert is inclined toward the side of the stop member facing the head. The result of this is that the stop or contact surface with the insert is larger than in a vertical surface orientation. In addition, this brings about additional support between the insert and stop member in the form of a wedging action.

The stop member can be mounted in the main casting of the tool by screwing, pinning or clamping. The stop member may also be connected with the main casting by a joint connection. However, a stop in the form of a ball can be expediently provided for the fixation of the stop member in the main casting of the tool. For this purpose, the stop member has at least one transverse bore to receive such a catch. In the same manner the sleeve member expediently has a corresponding transverse bore that can be made to overlap the transverse bore of the stop member.

With the sleeve member inserted into the main stop member, the single catch or each catch can be expediently locked by means of a threaded shaft in the form of a set screw which is provided in an extension of the inside threads of the sleeve member. The threaded shaft is used to deflect the catch radially into a wall recess of the longitudinal bore of the stop member. In this connection, the single catch or each catch is pressed out of the center in the direction of the bore wall when the threaded shaft is screwed in. In doing so, the catch engages the wall recess so that a positive and friction-secured joint is formed.

In another possible embodiment of the present invention, with the sleeve member inserted into the main stop member, the single catch or each catch can be preferably locked by means of a threaded shaft in the form of a set screw. The set screw can be provided in an extension of the inside threads of the sleeve member. The threaded shaft can be used to deflect the catch radially into a wall recess of the longitudinal bore of the stop member. In this connection, the single catch or each catch can be pressed out of the center in the direction of the bore wall when the threaded shaft is screwed in. In doing so, the catch engages the wall recess so that a positive and friction-secured joint can be formed. To further clarify the preceding sentence, positive and friction-secured connections, in at least one embodiment of the present invention, are essentially any type of connecting arrangement or structure, including such connecting arrangements or structures as bolts, screws, pins, fasteners, welding, adhesive bonding, pressure fittings, clamps, splines, form fittings, and contour fittings.

The adjustment screw expediently can have a conically formed countersunk head adjoining a screw neck of a reduced diameter. At the same time, the overall length of the screw is expediently shorter than the depth of the single transverse slot or of each transverse slot. In this connection, even when the adjustment screw is screwed in, its beveled end at the end of the threads is expediently always above the expansion bore of the transverse slot. The reduced diameter of the screw neck makes an elastic deformation of the conical screw head in relation to the threaded shaft possible, which has a particularly advantageous effect during adjustment. The adjustment screw head can thus follow the adjustment movement while no or substantially no relative movement takes place between the threaded shaft and sleeve member in the direction of the radial deflection. The sleeve member can follow the adjustment movement only together with the adjustment screw. This ensures that the threads of the adjustment screw are always engaged with the corresponding inside threads of the sleeve member independent of the adjustment lift.

Advantages obtained with the present invention include the fact that the use of a sleeve member that can be inserted into the stop member and which also carries the inside threads for the adjustment screw substantially ensures a particularly positive and reliable fixation of the adjustment screw. In addition, the stability under load of this connection is distinctly improved, especially when the insert is at maximum adjustment. In addition, the greater depth of the transverse slot in relation to the screw length results in a particularly extended length subject to bending and very well controlled flexural strength (bending cross section). Beyond that, the cross-sectional form of the stop member with its rounded off contact side and a linear stop side results in a broad area of contact with the cutter. In addition, the direction of movement of the following sleeve member reduces the bending load on the adjustment screw formed as a countersunk screw so that a particularly large amount of adjustment lift is possible.

The above discussed embodiments of the present invention will be described further hereinbelow with reference to the accompanying figures. When the word "invention" is used in this specification, the word "invention" includes "inventions," that is, the plural of "invention." By stating "invention," the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

Exemplary embodiments of the invention will be explained in greater detail below with reference to the drawings in which:

FIG. 5 shows one embodiment of the stop with two transverse slots; and

FIG. 6 shows one embodiment of the stop with three transverse slots.

Corresponding parts are provided with the same reference characters in all the drawings.

DESCRIPTION OF THE PREFERRED EMBODIMENT

Figure 1:
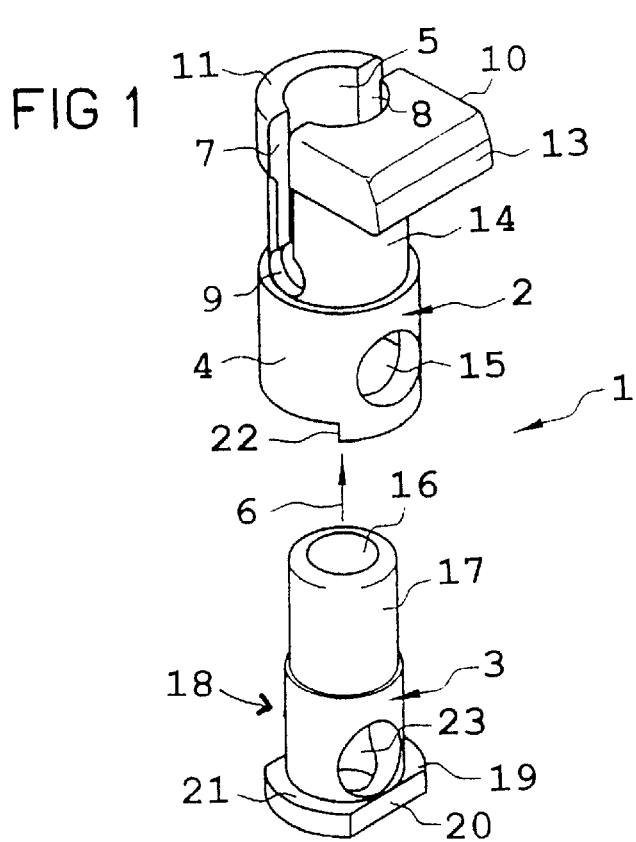
FIG. 1 shows an exploded perspective view of an adjustable stop with a stop member an a sleeve member.

FIG. 1 shows an adjustable stop 1 having an expandable stop member 2 and a sleeve member 3 which can be inserted into a longitudinal bore 5 of stop member 3 from its open end 4. The direction of insertion is indicated by arrow 6. The stop member 2 is transversely slotted, whereby opposite transverse slots 7 and 8 extend over approximately one-half the axial length of stop member 2 and open into an expansion bore, of which only expansion bore 9 assigned to transverse slot 7 is visible. The transverse slots 7 and 8 divide stop member 2 in the area of its head end into a bearing area 11 and a stop area 12 (see FIG. 3). While bearing area 11 is rounded off or formed to be half-round, stop area 12 is formed in the shape of a collar, thus forming a flat stop or contact surface 13 set at an angle. A collar-shaped head end 10 of stop member 2 is adjoined by a relief 14 encompassing the outer surface and extending to the end area of transverse slot 7, 8 so that an offset center area is formed in the outer surface of the stop member 2 which is formed in the shape of a hollow cylinder. A transverse bore 15 in alignment with stop area 12 is provided in the area of the open end 4.

The sleeve member 3, also formed in the shape of a hollow cylinder has inside threads 16. The outside surface of sleeve member 3 is stepped, whereby an area of snug fit 18 on the outer surface approximating the inside diameter of longitudinal bore 5 adjoins a narrow open section or open area 17 opposite the direction of insertion 6. The area of snug fit 18 is adjoined by a retaining collar 19 at the open end 20 of sleeve member 3. Retaining collar 19 is formed in such a way that each of two opposite, rounded off collar parts 21 is positively engaged with a corresponding marginal recess 22 on the open end 4 of stop member 2. This substantially ensures that the sleeve member 3 does not turn in relation to stop member 2 when installed. In the area of snug fit 18, sleeve member 3 has a transverse bore 23 corresponding to transverse bore 15 of stop member 2.

Figure 2:
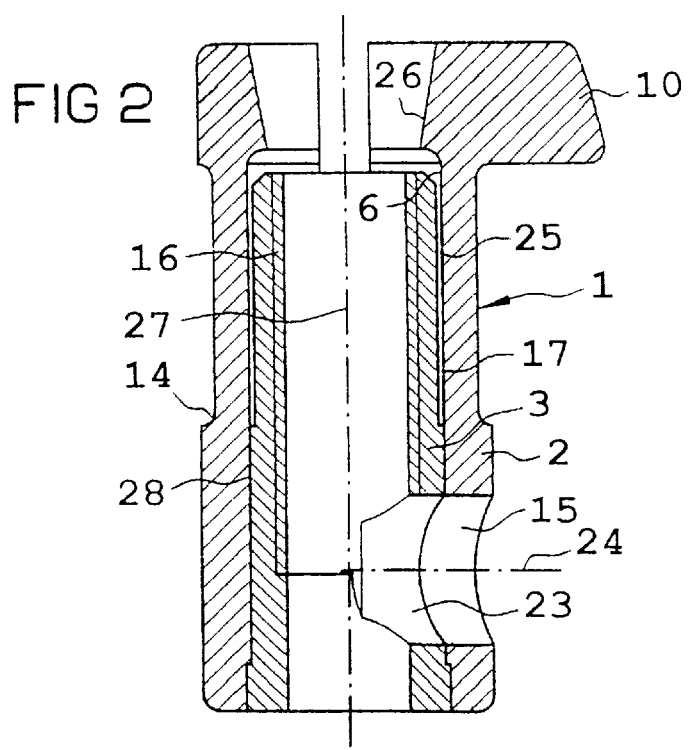
FIG. 2 shows a longitudinal section of the stop according to FIG. 1 with an inserted sleeve member.

FIG. 2 shows a longitudinal section of stop 1 with sleeve member 3 inserted into the longitudinal bore 5 of stop member 2. The inside threads 16 of sleeve member 3 extend at least to the axis of bore 24 of transverse bores 15 and 23. Stop member 2 and sleeve member 3 are arranged coaxially, whereby an annular space 25 for the radial deflection of sleeve member 3 is formed along the open area 17 between sleeve member 3 and stop member 2. In the area of head end 10 of stop member 2, longitudinal bore 5 changes gradually into a conical interior surface for the formation of an inner cone 26 tapering in the direction of longitudinal axis of stop 1. The area below this inner cone 26 of longitudinal bore 5 thus forms the seat area or seat space 28 of stop member 2 for sleeve member 3.

Figure 3:
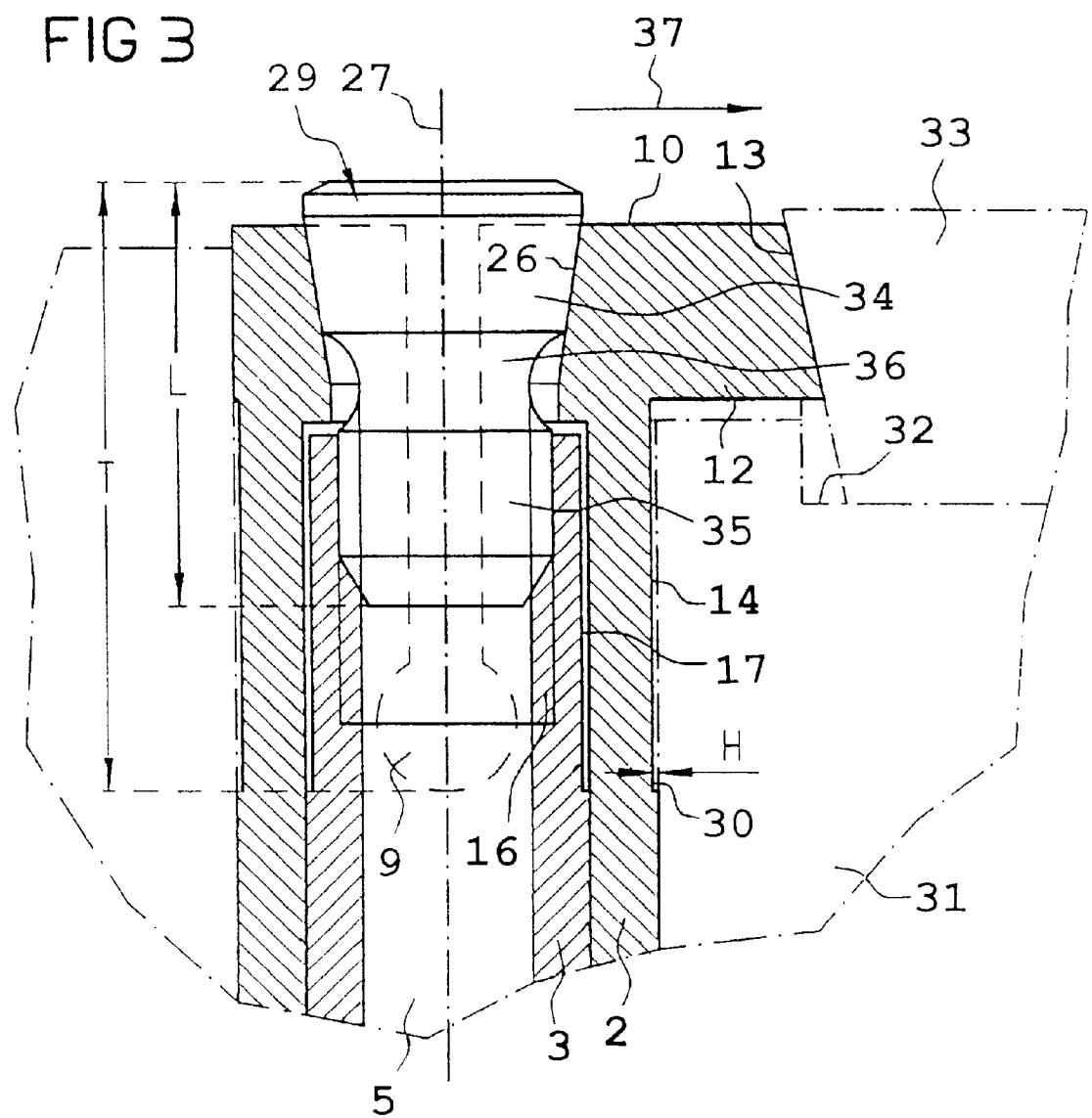
FIG. 3 shows a section of the basic casting of a tool with an inserted stop and an inserted adjustment screw.

FIG. 3 shows the adjustable stop 1 in a possible installed state with an inserted setting or adjustment screw 29. For that purpose, stop 1 is inserted into a seat bore 30 of the main casting or body of a tool 31. The stop area 12 at the head end 10 of a stop member 2 is guided toward a cutter 33 adjustably arranged in a guide slot 32 of main casting or body 31 so that the stop surface 13 is adjacent to cutter 33. The rounded off bearing area 11 on the inside wall of seat bore 30 of main casting 31 brings about a radial orientation of stop member 2 in relation to main casting 31 in a simple manner, resulting in complete contact of stop area 12 of stop member 2 with cutter 33.

The adjustment screw 29 has a conical countersunk head 34 with its outer contour adapted to inner cone 26. It is provided with a threadless screw neck of reduced diameter in the area between countersunk head 34 and a threaded shaft 35 if possible. In this connection the slot depth T of transverse slots 7, 8 exceed the overall screw length L. The fact that the transverse slots 7, 8 extend beyond the overall length L of adjustment screw 29 in the direction of longitudinal axis 27 and are limited at the open end 4 of stop member 2 brings about a long length subject to bending and a very well controlled flexural or bending strength with a particularly favorable bending cross-section are obtained.

The depth of relief 14 in the central area of stop member 2 defines the maximum adjustment lift H of stop 1 in main casting 31. The deeper this relief is, the greater is the adjustment lift H also. The production-related continuation of the surrounding relief 14 is without effect in the bearing area 11, since both it and the open end 4 are in direct contact with the inside wall of bore 30 of main casting 31. When adjustment screw 29 is screwed in, sleeve member 3 thus simply brings about a deflection of the head end 10 and the adjacent recessed part of stop member 2 in radial adjustment direction 37 crosswise to the longitudinal axis 27 of stop 1.

During an adjustment movement, the inside threads 16 of sleeve member 3 serving both to guide and to fix adjustment screw 29 constantly remain engaged by a positive and friction fit with the threaded shaft 35 of adjustment screw 29 even up to the maximum adjustment lift H. This engagement distinctly improves the load carrying capacity of this threaded connection. In addition, the open space within open area 17 between sleeve member 3 and stop member 2 brings it about that the inside threads 16 are able to follow the adjustment movement particularly well since the sleeve member 3 can move in direction of adjustment 37.

Figure 4:
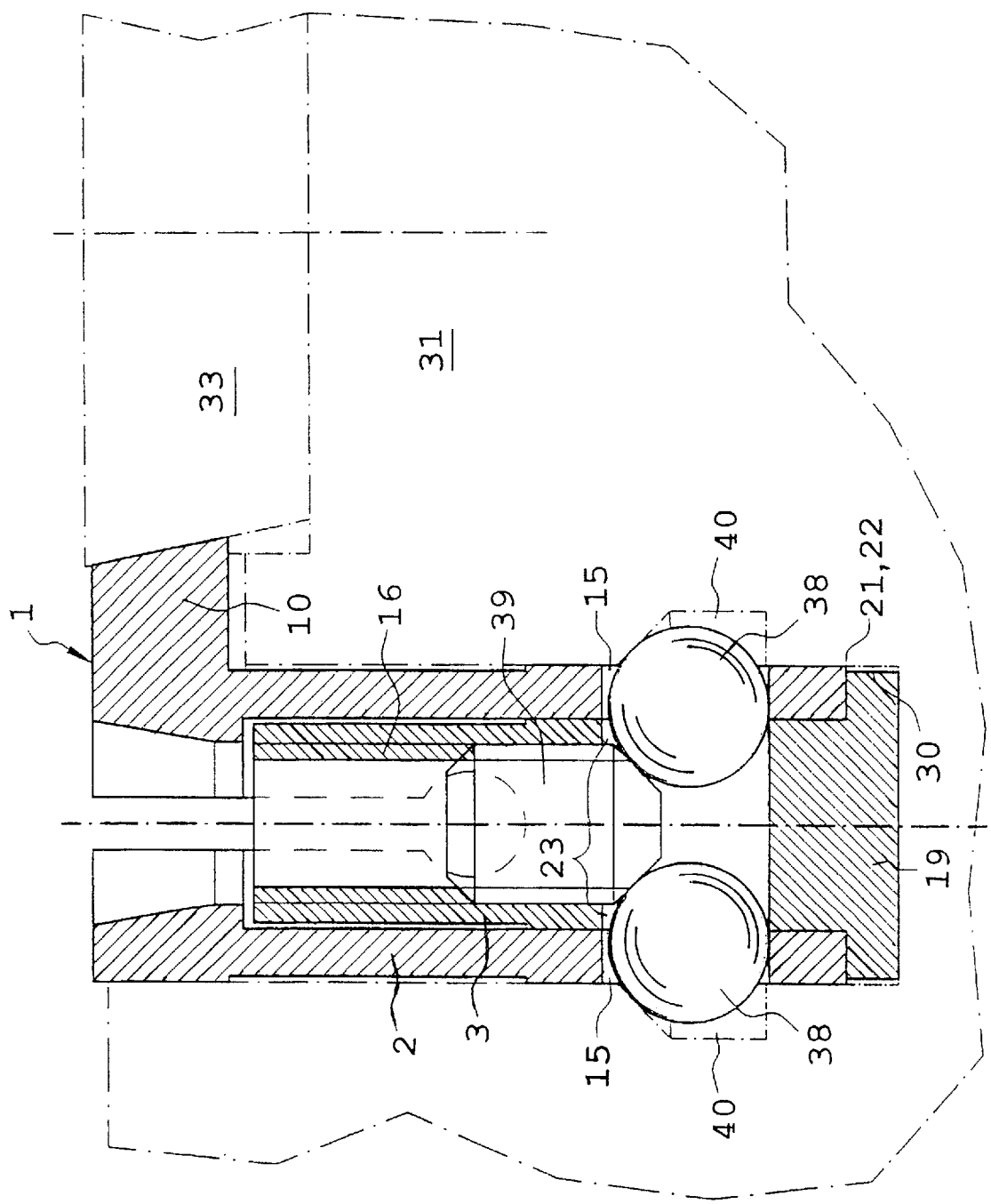
FIG. 4 shows a longitudinal section of the stop with two engaged balls.

FIG. 4 shows the adjustable stop 1 with two catches in the form of balls 38. One or both catches 38 serve to fix stop 1 in the main casting 31. In this holding mechanism, the balls 38 are carried in the transverse bores 15, 23 of stop member 2 and sleeve member 3 respectively, and thus crosswise or transverse to the direction of insertion 6 of stop 1. They are pressed from the center in or against the direction of adjustment 37 against the wall of seat bore 30 of main casting 31 by means of a set screw in the form of a threaded shaft, whereby the threaded shaft 39 is seated in the extension of inside thread 16 of sleeve member 3. The bored wall of bore 30 is provided with one recess each which the balls 39 engage producing a positive and friction joint.

FIG. 5 shows a top view of stop 1 in the installed state with the linear stop area 12 adjacent to cutter 33 and with the rounded off bearing area 11 adjacent to main casting 31. In this embodiment, adjusting screw 29 is provided with an Allen socket 41. A longitudinal slot or a cross recess may be provided instead of Allen socket 41.

While the slotted stop member 2 in the embodiment according to FIG. 5 has only two transverse slots 7, 8, the stop member in the embodiment according to FIG. 6 is provided with three transverse slots 42, 43, 44. In contrast to the embodiment according to FIG. 5, this stop 1 is divided into not only two segments, but rather into three segments 45a, 45b, and 46'. This brings about an additional effective direction so that the stop 1 according to FIG. 6 has a total of three effective directions 47a, 47b, and 48. The effective direction of expansion can thus be controlled by means of the number and by means of the symmetrical (FIG. 5) or stellate arrangement (FIG. 6) of transverse slots 7, 8 and 42 to 44. For example, four transverse slots would expediently result in a cross-shaped transverse slot arrangement, which will not be described in greater detail here.

One feature of the invention resides broadly in the adjustable stop for a cutter 33 adjustably arranged in a main casting of a tool 31 having a stop member 2 in the form of a hollow cylinder which is slotted and can be spread by means of an adjustment screw 29, characterized by a sleeve member 3 which can be inserted into a longitudinal bore 5 of a stop member 2 and having inside threads 16 which can be brought into engagement with the adjustment screw 29.

Another feature of the invention resides broadly in the stop characterized by the fact that the longitudinal bore 5 has an inner cone 26 at the head end 10 of the stop member 2 which cone is adjoined by a seat area 28 for the sleeve member 3.

Yet another feature of the invention resides broadly in the stop characterized by at least two transverse slots 7, 8 and 42 to 44 at the face end of stop member 2 dividing the end cross-sectional area of the stop member 2 into segments 45, 46, each transverse slot having an expansion bore 9 in its end region.

Still another feature of the invention resides broadly in the stop characterized by the fact that the sleeve member 3 has a retaining collar 19, 21 at its open end which can be brought into engagement with a marginal recess 22 of the stop member 2.

A further feature of the invention resides broadly in the stop member characterized by the fact that an open area 17 is provided between the stop member 2 and the sleeve member 3 below the head end 10 of the stop member 2.

Another feature of the invention resides broadly in the stop characterized by the fact that the sleeve member 3 is formed to be stepped on its outer surface, whereby an area of snug fit 18 approximating the longitudinal bore 5 adjoins the open area 17.

Yet another feature of the invention resides broadly in the stop characterized by the fact that the stop member 2 has a relief 14 on its outer surface which defines the adjustment lift H.

Still another feature of the invention resides broadly in the stop characterized by the fact that the stop member 2 has a rounded off bearing area 11 facing the main casting 31.

A further feature of the invention resides broadly in the stop characterized by the fact that the stop member 2 has a linear stop area 12 executed in the shape of a collar and facing the cutter 33.

Another feature of the invention resides broadly in the stop characterized by the fact that the stop member 2 has at least one transverse bore to receive a radially displaceable catch 38.

Yet another feature of the invention resides broadly in the stop characterized by the fact that the sleeve member 3 has a corresponding transverse hole 23 which can be made to overlap the transverse bore 15 of the stop member 2.

Still another feature of the invention resides broadly in the stop characterized by a threaded shaft 39 provided in the inside threads 16 for the radial deflection of the catch 38 into a wall recess 40 of the longitudinal bore 5 of the stop member 2.

A further feature of the invention resides broadly in the stop characterized by the fact that the adjustment screw 29 has a conically formed countersunk head 34 and a screw neck 36 of reduced diameter.

Another feature of the invention resides broadly in the stop characterized by the fact that the depth T of the transverse slot 7,8; 42 to 44 exceeds the overall length L of the adjustment screw 29.

Some examples of adjustable cutting tools or adjustable stops for a tool that could be adapted for use in the context of the present invention and include components that could be adapted for use in the embodiments of the present invention could be found in the following U.S. patents: U.S. Pat. No. 5,863,156, issued on Jan. 26, 1999 to inventors Satran, et al.; No. 5,640,890, issued on Jun. 24, 1997 to inventor McCollum; No. 5,564,320, issued on Oct. 15, 1996 to inventors Dahllof, et al.; No. 5,460,071, issued on Oct. 24, 1995 to inventors Barrett, et ano.; No. 5,393,176, issued on Feb. 28, 1995 to inventor Waring; No. 5,391,023, issued on Feb. 21, 1995 to inventor Basteck; No. 5,377,410, issued on Jan. 3, 1995 to inventor Welch; No. 5,209,145, issued on May 11, 1993 to inventor Baudermann; No. 5,156,501, issued on Oct. 20, 1992 to inventors Pawlik, et al.; No. 4,911,047, issued on Mar. 27, 1990 to inventors Hornung, et al.; and No. 4,648,757, issued on Mar. 10, 1987 to inventor Plummer.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 197 12 959.5, filed on Mar. 27, 1997, and 197 17 741.7, filed on Apr. 26, 1997, having inventors Gebhard Müller, Horst Jäger and Martin Voll, and DE-OS 197 12 959.5, DE-OS 197 17 741.7, DE-PS 197 12 959.5, and DE-PS 197 17 741.7 and International Application No. PCT/EP98/00470, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

At least partial list of reference characters

1. Adjustable stop
2. Stop member
3. Sleeve member
4. Open end
5. Longitudinal bore
6. Direction of insertion
7,8. Transverse slot
9. Expansion bore
10. Head end
11. Bearing area
12. Stop area
13. Stop/contact surface
14. Relief
15. Transverse bore
16. Inside threads
17. Open area
18. Area of snug fit
19. Retaining collar
20. Open end
21. Collar part
22. Marginal recess
23. Transverse bore
24. Axis of bore
25. Annular space
26. Inner cone
27. Longitudinal axis
28. Seat area
29. Adjustment screw
30. Seat bore
31. Main casting of a tool
32. Guide slot
33. Cutter
34. Countersunk head
35. Threaded shaft
36. Screw neck
37. Direction of adjustment
38. Catch/ball
39. Threaded shaft
40. Recess
41. Allen socket
42–44 Transverse slot
45,46 Segment
47,48 Effective direction
H. Adjustment lift
L. Screw length
T. Slot depth

What is claimed is:

1. A method for forming metal with a milling cutter, said milling cutter comprising:
   a cutting device being configured to shape a metal piece;
   a holder;
   an adjustable stop member;
   said stop member being configured and disposed to be mounted in said holder;
   said stop member being substantially tube-shaped;
   said stop member comprising at least one longitudinal slot;
   said at least one longitudinal slot being disposed to permit displacement of a portion of said stop member;
   an adjustment screw;
   said adjustment screw being configured to be inserted into said stop member to spread said portion of said stop member;
   said cutting device being configured and disposed to be operatively in contact with said portion of said adjustable stop member to permit displacement of said cutting device upon displacement of said portion of said adjustable stop member;
   a sleeve member;
   said sleeve member being configured to be inserted into said stop member;
   said sleeve member comprising an inside threaded portion;
   and said adjustment screw being configured to be engaged with said inside threaded portion of said sleeve member;
   said method comprising the steps of:
      determining a desired depth of cut for a metal piece to be formed;
      positioning said cutting device in said holder at a desired distance to permit the desired depth of cut;
      said step of positioning said cutting device comprising adjusting said adjustable stop member, which adjustable stop member is operatively in contact with said cutting device;
      said step of adjusting said adjustable stop member comprising:
         screwing said adjustment screw into said adjustable stop member;
         spreading said portion of said adjustable stop member by insertion of said adjustment screw into said adjustable stop member;
         moving said cutting device by spreading said portion of said adjustable stop member; and
         continuing screwing said adjustment screw into said adjustable stop member until the desired distance relating to the desired depth to be cut is achieved;
      rotating said cutting device in said milling cutter;
      engaging a metal piece to be formed with said cutting device in said milling cutter;
      forming said metal piece; and
      disengaging said cutting device and said milling cutter from said metal piece upon completing forming of said metal piece.

2. A milling cutter for forming metal, said milling cutter comprising:
   a cutting device being configured to shape a metal piece;
   a holder;
   an adjustable stop member;
   said stop member being configured and disposed to be mounted in said holder;
   said stop member being substantially tube-shaped;
   said stop member comprising at least one longitudinal slot;

said at least one longitudinal slot being disposed to permit displacement of a portion of said stop member;

an adjustment screw;

said adjustment screw being configured to be inserted into said stop member to cause displacement of said portion of said stop member;

said cutting device being configured and disposed to be operatively in contact with said portion of said adjustable stop member to permit displacement of said cutting device upon displacement of said portion of said adjustable stop member;

a sleeve member;

said sleeve member being configured to be inserted into said stop member;

said sleeve member comprising a threaded portion; and said adjustment screw being configured to be engaged with said threaded portion of said sleeve member.

3. The milling cutter according to claim 2, wherein:

said stop member has a first end section and a second end section;

said first end section is disposed opposite said second end section;

said adjustment screw is configured to be inserted through said first end section;

said sleeve member is configured to be inserted through said second end section;

said first end section has a substantially cone-shaped interior;

said cone-shaped interior has a first portion and a second portion;

said second portion has a diameter and said first portion has a diameter;

the diameter of said second portion is greater than the diameter of said first portion;

said stop member comprises a seat area configured to receive and make contact with said sleeve member;

said first portion of said cone-shaped interior is disposed adjacent said seat area;

said at least one longitudinal slot comprises at least two longitudinal slots;

said at least two longitudinal slots are disposed to form segments in said stop member;

each of said at least two longitudinal slots has a first end and a second end disposed opposite said first end;

said first end of each of said at least two longitudinal slots is disposed at said first end section of said stop member;

each of said at least two longitudinal slots comprises an expansion bore to permit expansion of its corresponding longitudinal slot upon insertion of said adjustment screw in said stop member; and each said expansion bore is disposed at said second end of its corresponding longitudinal slot.

4. The milling cutter according to claim 3, wherein:

said sleeve member has a first end and a second end, which first end is disposed opposite said second end;

said first end of said sleeve member is disposed to be inserted into said stop member;

said second end section of said stop member comprises a recessed portion;

said second end of said sleeve member comprises a retaining collar configured to conform to and engage with said recessed portion of said stop member;

said sleeve member comprises a first portion and a second portion;

said first portion of said sleeve member has a substantially smaller diameter than said second portion of said sleeve member;

said sleeve member comprises a stepped portion disposed between said first portion of said sleeve member and said second portion of said sleeve member;

said first portion of said sleeve member is disposed adjacent said cone-shaped interior of said stop member;

said diameter of said first portion of said sleeve member is substantially smaller than the diameter of the inside of said stop member;

said diameter of said second portion of said sleeve member is substantially similar to the diameter of the inside of said stop member to provide a contact fit between said sleeve member and said stop member at said seat area;

said stepped portion of said sleeve member is disposed immediately adjacent said expansion bore;

said stop member comprises a first outside portion and a second outside portion;

said second outside portion is substantially smaller in diameter than said first outside portion;

a portion of said second outside portion comprises a relief area disposed closer to the longitudinal axis of said stop member than a corresponding portion of said first outside portion; and said relief area comprises an area to permit an adjustment lift.

5. The milling cutter according to claim 4, wherein:

said segments of said stop member comprise:

a rounded-off bearing segment having a substantially curvilinear C-shape;

a linear stop segment having a length and width, which length is greater than the width;

said stop segment comprises an extending portion, which extending portion extends in a substantially perpendicular direction with respect to said length of said stop segment;

said holder comprises a main section and cutting section;

said main section is disposed to face opposite said cutting section;

said bearing segment is disposed adjacent said main section;

said stop segment is disposed opposite said bearing segment and adjacent said cutting section;

said stop member has a length and width, which length is greater than the width;

said stop member comprises at least one transverse bore, which at least one transverse bore is transverse with respect to the length of said stop member;

said at least one transverse bore is configured to receive a radially displaceable catch device;

said catch device is configured to hold said stop member in said holder;

said sleeve member comprises at least one transverse hole which corresponds to said at least one transverse bore of said stop member; and said at least one transverse hole of said sleeve member is configured to overlap with a corresponding one of said at least one transverse bore of said stop member upon said sleeve member being disposed in said stop member.

6. The milling cutter according to claim 5, wherein:

said milling cutter comprises a threaded shaft;

said threaded shaft is configured to be inserted into said sleeve member and to be engaged with said threaded portion of said sleeve member;

said holder comprises a recess disposed immediately adjacent said catch device;

said recess is configured to receive said catch device;

said threaded shaft is configured to contact said catch device to thus deflect said catch device into said recess;

said adjustment screw comprises:
 a cone-shaped countersunk head;
 a neck portion disposed substantially adjacent said head; and
 the diameter of said neck portion is substantially smaller than the diameter of said head; and
 the length of said at least two longitudinal slots is substantially greater than the length of said adjustment screw.

7. In a cutting arrangement for forming metal, an adjustable stop comprising:

a stop member;

said stop member being configured to be mounted in a tool holder;

said stop member being substantially cylindrical;

said stop member comprising at least one longitudinal slot;

said at least one longitudinal slot being disposed to permit spreading of at least a portion of said stop member;

an adjustment screw;

said adjustment screw being configured to be inserted into said stop member to cause spreading of said at least a portion of said stop member;

a sleeve member;

said sleeve member being configured to be inserted into said stop member;

said sleeve member comprising a threaded portion; and said adjustment screw being configured to be engaged with said threaded portion of said sleeve member.

8. The adjustable stop according to claim 7, wherein:

said stop member has a first end section and a second end section;

said first end section is disposed opposite said second end section;

said adjustment screw is configured to be inserted through said first end section;

said sleeve member is configured to be inserted through said second end section;

said first end section has a substantially cone-shaped interior;

said cone-shaped interior has a first portion and a second portion;

said second portion has a diameter and said first portion has a diameter;

the diameter of said second portion is greater than the diameter of said first portion;

said stop member comprises a seat area configured to receive and make contact with said sleeve member; and said first portion of said cone-shaped interior is disposed adjacent said seat area.

9. The adjustable stop according to claim 8, wherein:

said at least one longitudinal slot comprises at least two longitudinal slots;

said at least two longitudinal slots are disposed to form segments in said stop member;

each of said at least two longitudinal slots has a first end and a second end disposed opposite said first end;

said first end of each of said at least two longitudinal slots is disposed at said first end section of said stop member;

each of said at least two longitudinal slots comprises an expansion bore to permit expansion of its corresponding longitudinal slot upon insertion of said adjustment screw in said stop member; and each said expansion bore is disposed at said second end of its corresponding longitudinal slot.

10. The adjustable stop according to claim 9, wherein:

said sleeve member has a first end and a second end, which first end is disposed opposite said second end;

said first end of said sleeve member is disposed to be inserted into said stop member;

said second end section of said stop member comprises a recessed portion; and said second end of said sleeve member comprises a retaining collar configured to conform to and engage with said recessed portion of said stop member.

11. The adjustable stop according to claim 10, wherein:

said sleeve member comprises a first portion and a second portion;

said first portion of said sleeve member has a substantially smaller diameter than said second portion of said sleeve member;

said sleeve member comprises a stepped portion disposed between said first portion of said sleeve member and said second portion of said sleeve member;

said first portion of said sleeve member is disposed adjacent said cone-shaped interior of said stop member;

said diameter of said first portion of said sleeve member is substantially smaller than the diameter of the inside of said stop member;

said diameter of said second portion of said sleeve member is substantially similar to the diameter of the inside of said stop member to provide a contact fit between said sleeve member and said stop member at said seat area; and said stepped portion of said sleeve member is disposed immediately adjacent said expansion bore.

12. The adjustable stop according to claim 11, wherein:

said stop member comprises a first outside portion and a second outside portion;

said second outside portion is substantially smaller in diameter than said first outside portion;

a portion of said second outside portion comprises a relief area disposed closer to the longitudinal axis of said stop member than a corresponding portion of said first outside portion; and said relief area comprises an area to permit an adjustment lift.

13. The adjustable stop according to claim 12, wherein said segments of said stop member comprise:

a rounded-off bearing segment having a substantially curvilinear C-shape;

a linear stop segment having a length and width, which length is greater than the width;

said stop segment comprises an extending portion, which extending portion extends in a substantially perpendicular direction with respect to said length of said stop segment and away from said bearing segment; and said stop segment is disposed opposite said bearing segment on said stop member.

14. The adjustable stop according to claim 13, wherein:

said stop member has a length and width, which length is greater than the width;

said stop member comprises at least one transverse bore, which at least one transverse bore is transverse with respect to the length of said stop member;

said at least one transverse bore is configured to receive a radially displaceable catch device; and said catch device is configured to hold said stop member in a tool holder.

15. The adjustable stop according to claim 14, wherein:

said sleeve member comprises at least one transverse hole which corresponds to said at least one transverse bore of said stop member; and said at least one transverse hole of said sleeve member is configured to overlap with a corresponding one of said at least one transverse bore of said stop member upon said sleeve member being disposed in said stop member.

16. The adjustable stop according to claim 15, wherein:

said adjustable stop comprises a threaded shaft;

said threaded shaft is configured to be inserted into said sleeve member and to be engaged with said threaded portion of said sleeve member; and said threaded shaft is configured to contact said catch device to thus deflect said catch device into a recess in a tool holder to hold said adjustable stop in a tool holder.

17. The adjustable stop according to claim 16, wherein said adjustment screw comprises:

a cone-shaped countersunk head;

a neck portion disposed substantially adjacent said head; and the diameter of said neck portion is substantially smaller than the diameter of said head.

18. The adjustable stop according to claim 17, wherein the length of said at least two longitudinal slots is substantially greater than the length of said adjustment screw.

* * * * *